United States Patent [19]
Chen

[11] Patent Number: 6,053,639
[45] Date of Patent: Apr. 25, 2000

[54] OPTIC FIBER INNER TUBE CONNECTOR

[76] Inventor: Chung-Fang Chen, 4500 E. Cerro Vista Dr., Anaheim, Calif. 92807

[21] Appl. No.: 09/109,007

[22] Filed: Jul. 1, 1998

[51] Int. Cl.[7] ...................................................... G02B 6/36
[52] U.S. Cl. .................................. 385/53; 385/78; 385/87
[58] Field of Search ................................. 385/15, 31, 39, 385/53, 55, 56, 76–78, 87

[56] References Cited

U.S. PATENT DOCUMENTS

| | | | |
|---|---|---|---|
| 4,737,009 | 4/1988 | Kakii et al. ................................ | 385/60 |
| 5,644,673 | 7/1997 | Patterson .................................. | 385/138 |

*Primary Examiner*—John D. Lee
*Assistant Examiner*—Michelle R. Connelly-Cushwa
*Attorney, Agent, or Firm*—Pro-Techtor International Services

[57] ABSTRACT

An optic fiber inner tube connector includes an elongated tubular body having a central bore extending along a central axis and two threaded sections for engaging inner-threaded end caps. Each end cap has an inward flange having an inside diameter sufficient to allow the inner tube to extend therethrough. An axially movable retainer ring is provided between the flange of the end cap and the axial end of the body and having a circumferential channel spaced from the end of the body for holding therebetween a sealing ring which is deformable to sealingly engage the inner tube. The retainer ring catches to engage cavities formed on a deformable gripping member to fix the gripping member in the retainer ring. The gripping member is located between the flange of the end cap and the retainer ring, having an outside surface in wedging engagement with both the end cap and the retainer ring and an inside surface having teeth for catching the inner tube when the gripping ring is deformed inward due to the wedging force caused by the axial movement of the end cap. A resilient centering and sealing ring is provided inside the central bore, having an inclined face which radially centers the inner tube inside the body and hermetically seals the end of the inner tube when the end of the inner tube is forced into contact with the centering and sealing ring.

14 Claims, 13 Drawing Sheets

OPTIC FIBER INNER TUBE CONNECTOR

FIELD OF THE INVENTION

The present invention relates to an optic fiber inner tube connector and in particular to an optic fiber inner tube connector which allows ready site connection with improved air- and humidity-tightness and stretching resistance.

BACKGROUND OF THE INVENTION

With the development of communication industry, conventional copper cables adapted in the telecommunication system have been gradually replaced by more efficient and light-weighted optic fiber cables. However, due to the fragility of the optic fiber, the optic fiber cable requires more severe protection. In general, an optic fiber cable comprises an outer tube inside which three or four inner tubes are received. Each of the inner tubes has an optic fiber extending therethrough. Currently, the outer tube of the optic fiber cable is made of polyvinyl chloride and the inner tube is made of polyethylene.

In a practical installation of the optic fiber cable, the outer tube is first embedded under ground. Thereafter the inner tubes, each of which is comprised of a plurality of separate segments, are put into the outer tube segment by segment and the segments of the inner tubes are then interconnected by means of a connector which is referred to as "inner tube connector" herein. Finally, the optic fiber is inserted through each of the inner tubes by means of compressed air. The compressed air brings the optic fiber from one end of the inner tube to the opposite end. To effectively make use of the compressed air in moving the optic fiber through the inner tube, the inner tube has to be air-tight, namely, the inner tube has to be hermetic through the whole length thereof, including the connection made by the connector. Thus air-tightness of the connection between two segments of the inner tube is of vital importance in using compressed air to move the optic fiber through the inner tube.

In addition, the air-tightness of the inner tube connector is also important in protecting the optic fiber from being damaged by invasion of humidity, insects or unwanted foreign objects. Thus, how to efficiently and effectively connect two segments of an optic fiber inner tube in the working sites is a topic that requires continuous research and development for the optic fiber industry.

Further, in order to provide the connection between the inner tube segments with a sufficient strength to resist un-wanted separation of the inner tube segments from each other, the inner tube segments have to be securely and firmly attached to the connector once they are connected by the connector in order to resist the stretching force applied thereto.

In addition, since the inner tubes may be supplied by different manufacturers and since the tolerance of the outside diameter of the inner tubes usually has no strict requirement, the connector that is used to connect two inner tube segments has to accommodate the outside diameter tolerances of the inner tubes from different suppliers. For example, the inner tubes of a nominal outside diameter of one and a quarter inches that are currently available in the market usually have several different values of the actual outside diameter and the maximum difference therebetween may as large as 6 mm. The conventional inner tube connectors that are currently available are incapable to effectively handle the variations in the tolerance of the outside diameter of the inner tubes in providing an effective air-tightness between the inner tube segments.

Further, in order to allow the inner tube segments to be readily inserted into and secured to the connector, a radial clearance is usually provided between the connector casing and the inner tube segments which may cause improper axial alignment between the two inner tube segments that are connected by the connector. Thus the segment may be offset with respect to each other in the radial direction. This causes problems in inserting the optic fiber through segments of the inner tube.

To overcome the above problems, in U.S. patent application Ser. No. 08/825,234, now U.S. Pat. No. 5,832,158, filed on Mar. 29, 1997, the applicant proposed an inner tube connector which is effective in solving the above problems. However, the structure of such a connector still has drawbacks in providing a ready and trouble-free installation of the connector.

Thus, it is desirable to provide an improvement over the conventional optic fiber inner tube connector which allows the connector to be installed in a more ready and less trouble way.

OBJECTS OF THE INVENTION

Therefore, an object of the present invention is to provide an optic fiber inner tube connector which, besides (1) allowing an air-tight connection of two inner tube segments to be readily done in the working site, (2) providing a firm and secure attachment to the inner tube segments capable to resist stretching and distortion of the inner tubes, (3) providing an improved and more effective sealing between inner tube segments, (4) precisely aligning the inner tube segments in the axial direction, and (5) capable to accommodate the great variation in the manufacturing tolerances of the inner tube outside diameter, allows connection between the inner tube segments to be carried out in a more efficient and effective way, shortening the time needed in installing the optic fiber cable.

To achieve the above and other objects, there is provided an optic fiber inner tube connector comprising an elongated tubular body having a central bore extending along a central axis and two threaded sections for engaging inner-threaded end caps. Each end cap has an inward flange having an inside diameter sufficient to allow the inner tube to extend therethrough. An axially movable retainer ring is provided between the flange of the end cap and the axial end of the body and having a circumferential channel spaced from the end of the body for holding therebetween a sealing ring which is deformable to sealingly engage the inner tube. The retainer ring catches to engage cavities formed on a deformable gripping member to fix the gripping member in the retainer ring. The gripping member is located between the flange of the end cap and the retainer ring, having an outside surface in wedging engagement with both the end cap and the retainer ring and an inside surface having teeth for catching the inner tube when the gripping ring is deformed inward due to the wedging force caused by the axial movement of the end cap. A resilient centering and sealing ring is provided inside the central bore, having an inclined face which radially centers the inner tube inside the body and hermetically seals the end of the inner tube when the end of the inner tube is forced into contact with the centering and sealing ring.

BRIEF DESCRIPTION OF THE DRAWINGS

The present invention will be better understood from the following description of a preferred embodiment thereof, which is illustrative and not limitative, with reference to the attached drawings, wherein.

DETAILED DESCRIPTION OF THE PREFERRED EMBODIMENTS

Figure 1:
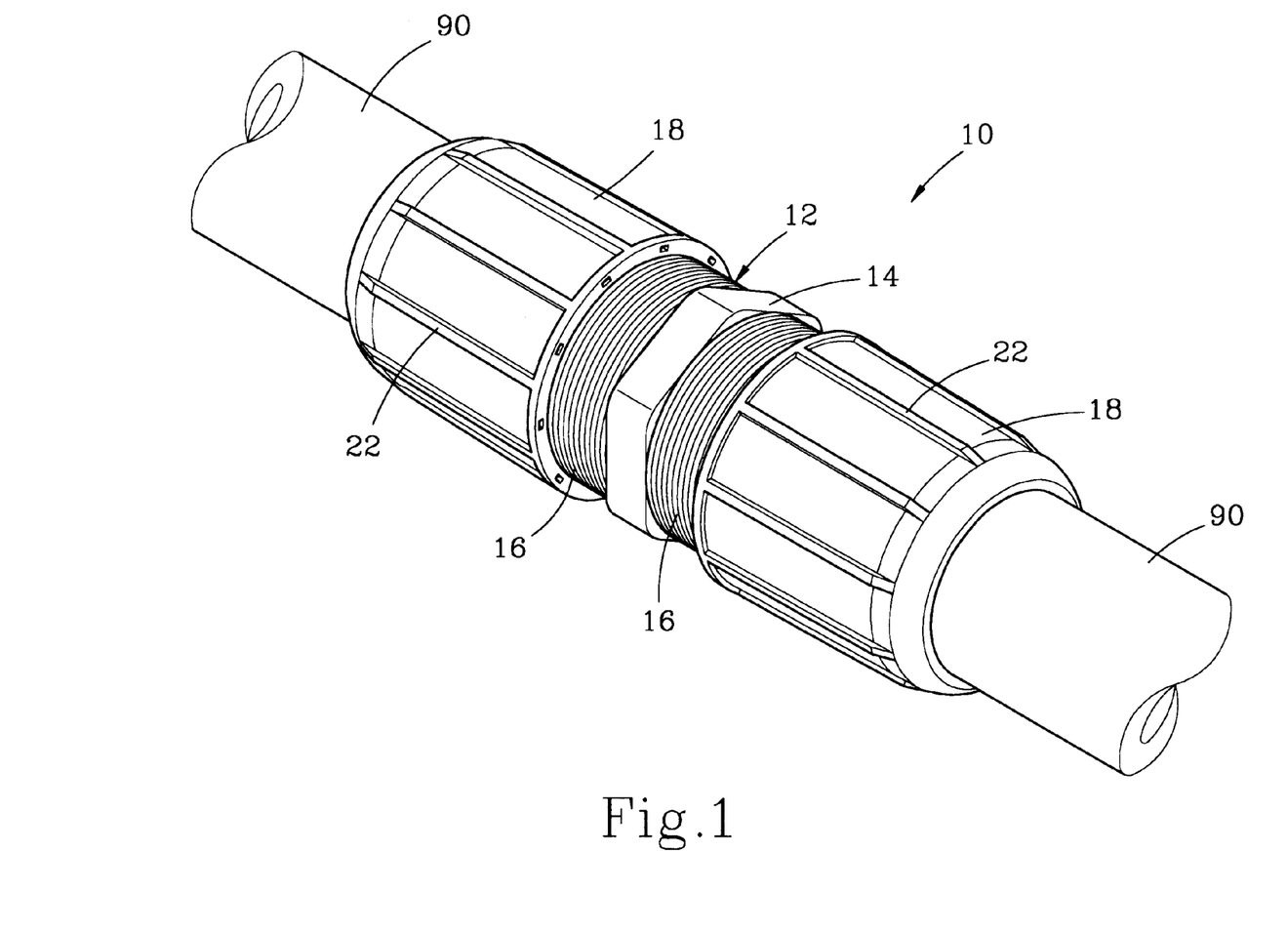
FIG. 1 is a perspective view showing an optic fiber inner tube connector constructed in accordance with the present invention with two inner tube segments connected thereto, optic fiber to be disposed inside the inner tube being omitted for clarity.

With reference to the drawings and in particular to FIG. 1, wherein an optic fiber inner tube connector constructed in accordance with the present invention, generally designated at the reference numeral 10, is shown, the optic fiber inner tube connector 10 (which will also be referred to as connector or inner tube connector herein for simplicity) is to connect two segments of an optic fiber inner tube which are designated at reference numeral 90 (also see FIG. 2, but the optic fiber that is received inside the inner tube segments 90 is not shown) extending in an axial direction so that the construction of the connector 10 at two axial end sides is symmetric about an axial center thereof. For simplicity, the following description of the connector 10 is made to one of the two end sides thereof, but it is understood that the description is also applicable to the other end side construction. Further, the parts or members of the two end sides of the connector 10 bear the same reference numerals in the drawings.

Figure 2:
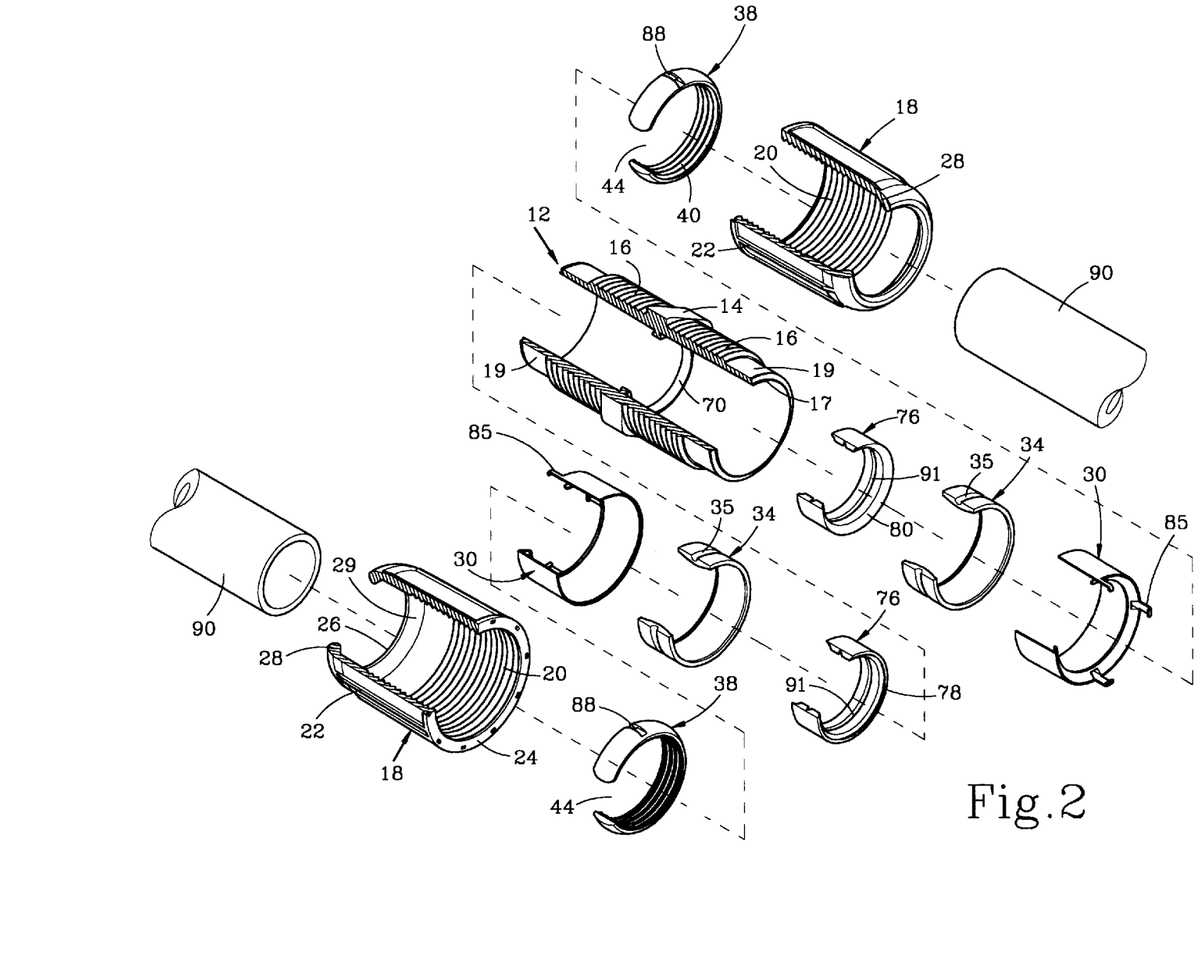
FIG. 2 is an exploded perspective view of the optic fiber inner tube connector in accordance with the present invention, together with portions of the inner tube segments to be connected thereby.
Figure 3:
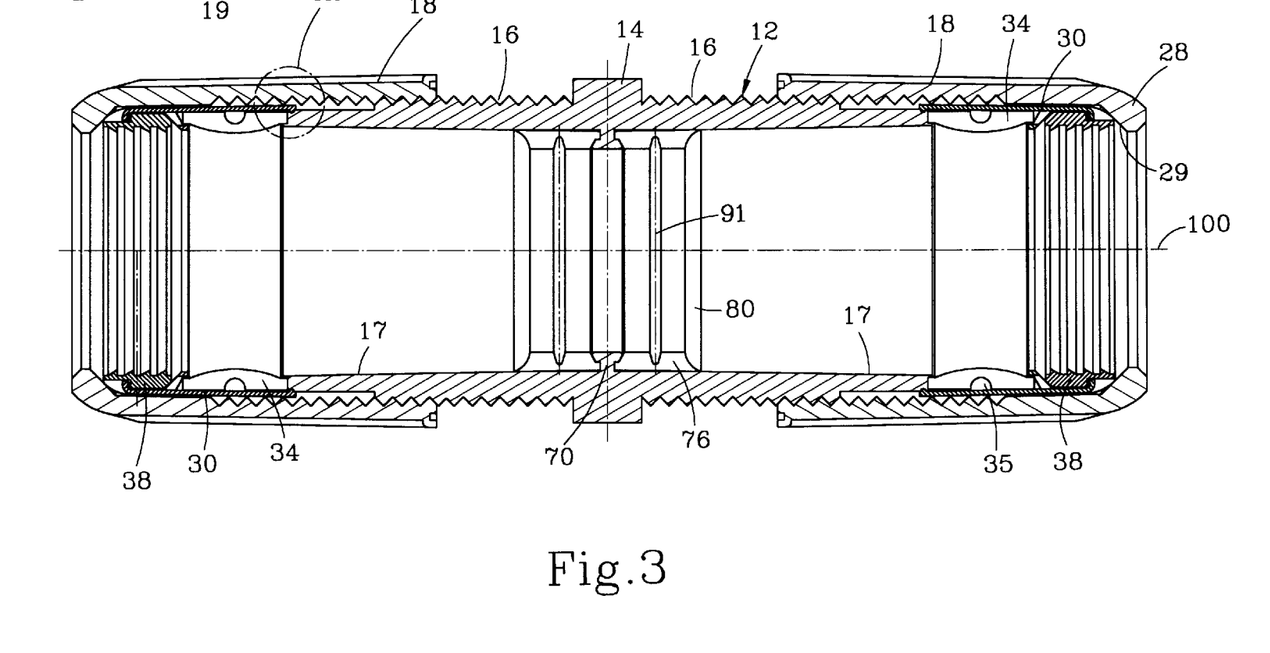
FIG. 3 is a sectional view of the inner tube connector in accordance with the present invention.

With reference to FIGS. 1, 2 and 3 for a more detailed description of the connector 10, the connector 10 comprises an elongated cylindrical or tubular body 12 defining therein a central bore 102 for receiving ends of the inner tube segments 90 and having a central axis 100 (FIG. 3) extending in the axial direction of the connector 10. The construction of the cylindrical body 10 is particularly shown in FIGS. 4 and 5. On the outer surface, the cylindrical body 12 comprises a central section 14 and two externally threaded sections 16 on two opposite sides of the central section 14 (in the axial direction 100) for threading engagement with inner-threaded end caps 18 (also see FIGS. 8 and 9). Axially outboard the threaded section 16, a non-threaded receiving section 19 with a diameter smaller than the nominal diameter of the threaded section 16 is provided on the cylindrical body 12. A circumferential shoulder 17 (also see FIG. 4A) is further formed on the cylindrical body 12 at the outermost position outboard the receiving section 19 in the axial direction. The receiving section 19 and the shoulder 17 will be further described hereinafter.

Preferably, the central section 14 of the cylindrical body 12 has a hexagon or other polygonal cross section for driving engagement with a hand tool, such as a pipe wrench or an adjustable wrench to facilitate tightening the end caps 18 to the cylindrical body 12.

Figure 4:
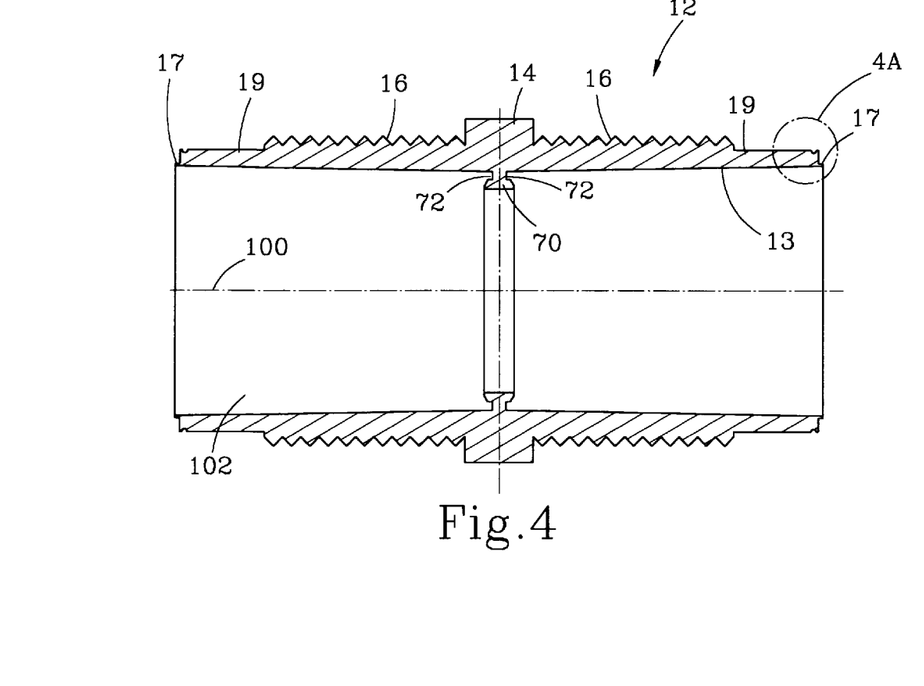
FIG. 4 is a sectional view of the cylindrical connector body of the inner tube connector in accordance with the present invention.
Figure 4A:
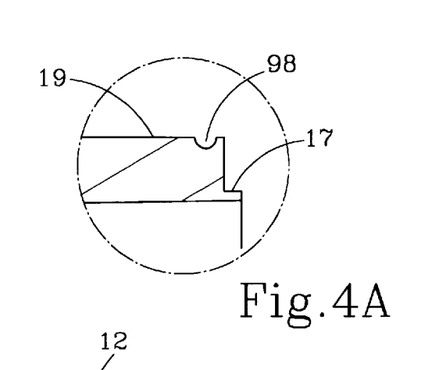
FIG. 4A is an enlarged view of the circled portion labeled 4A in FIG. 4.
Figure 5:
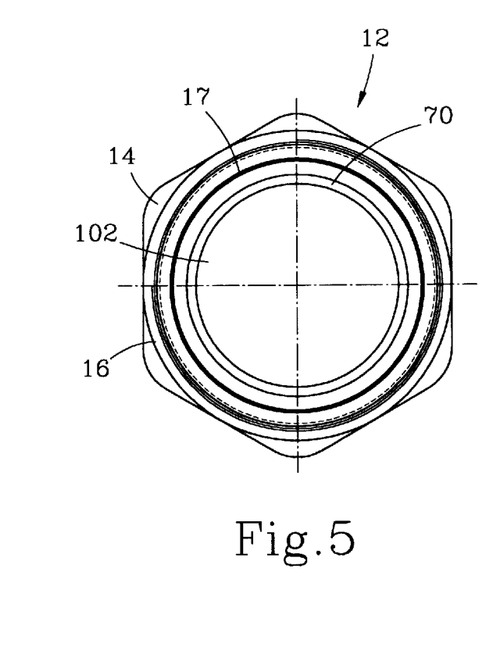
FIG. 5 is an axial end view of the connector body shown in FIG. 4.

With reference to FIGS. 4 and 5, the cylindrical body 12 comprises a circumferential rib or raised portion 70 formed on an inside surface 13 of the central bore 102 and preferably substantially axially centered. The rib 70 has a circumferential slot 72 formed on each of two axially opposite sides of the rib 70 to partially receive and hold therein a centering and sealing ring 76 (see FIG. 3).

Figure 10:
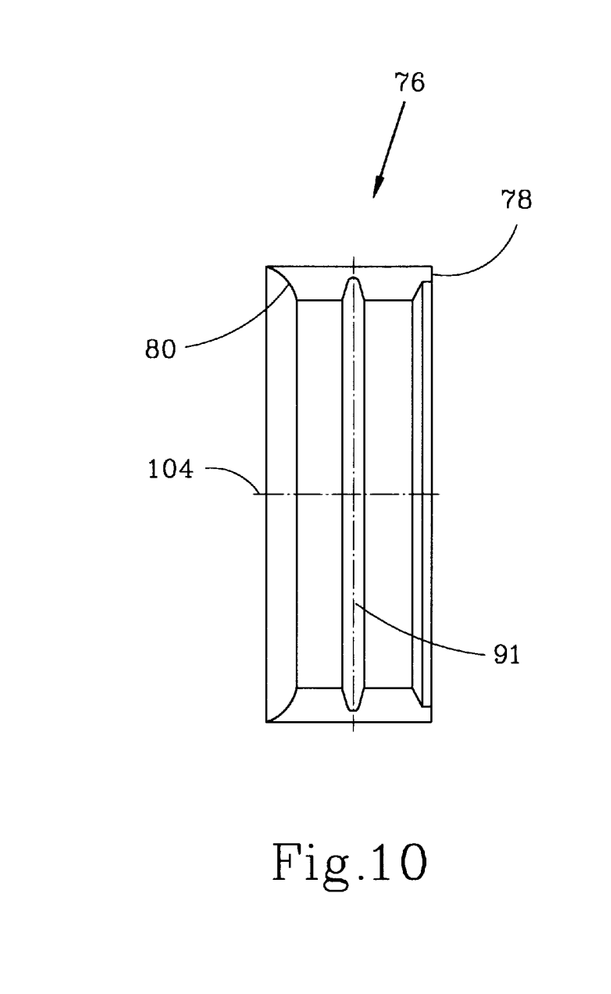
FIG. 10 is a sectional view of the centering and sealing ring of the inner tube connector in accordance with the present invention.
Figure 11:
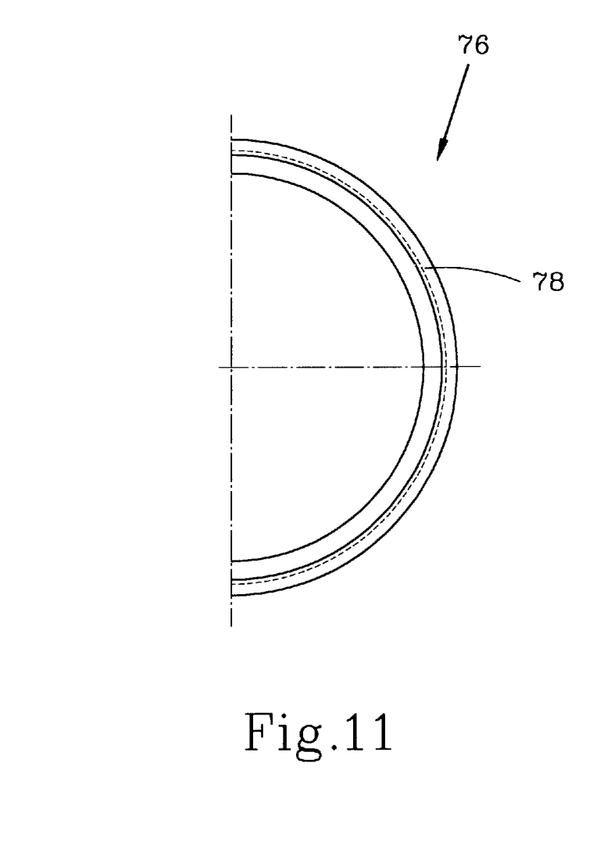
FIG. 11 is an axial end view of the centering and sealing ring shown in FIG. 10, which due to symmetry is shown in half only.

FIGS. 10 and 11 respectively show a sectional view and an axial end view of a preferred embodiment of the centering and sealing ring 76. The centering and sealing ring 76 is a circular ring member, having a central axis 104 (see FIG. 10) substantially coincident with the central axis 100 of the cylindrical body 12. The centering and sealing ring 76 has two axially opposite sides and comprises a circumferential end rim 78 formed on a first one of the two axial sides thereof. The rim 78 has a size and shape corresponding to the slot 72 of the rib 70 so as to be fit therein to fix the centering and sealing ring 76 inside the cylindrical body 12.

The centering and sealing ring 76 also has a circumferentially-extending inclined face 80 formed on a second one of the two axially opposite sides thereof which diverges in an axially outward direction for providing a camming function. Preferably, the inclined face 80 comprises a convex circular arc configuration so that when the end of the inner tube segment 90 is inserted into the bore 102 of the cylindrical body 10 and brought into contact with the inclined face 80 of the centering and sealing ring 76, due to the camming function provided by the inclined face 80, the inner tube segment 90 will be guided and driven to be substantially concentrically coincident with the central axis 100 of the cylindrical body 12 or the central axis 104 of the centering and sealing ring 76.

Figure 17:
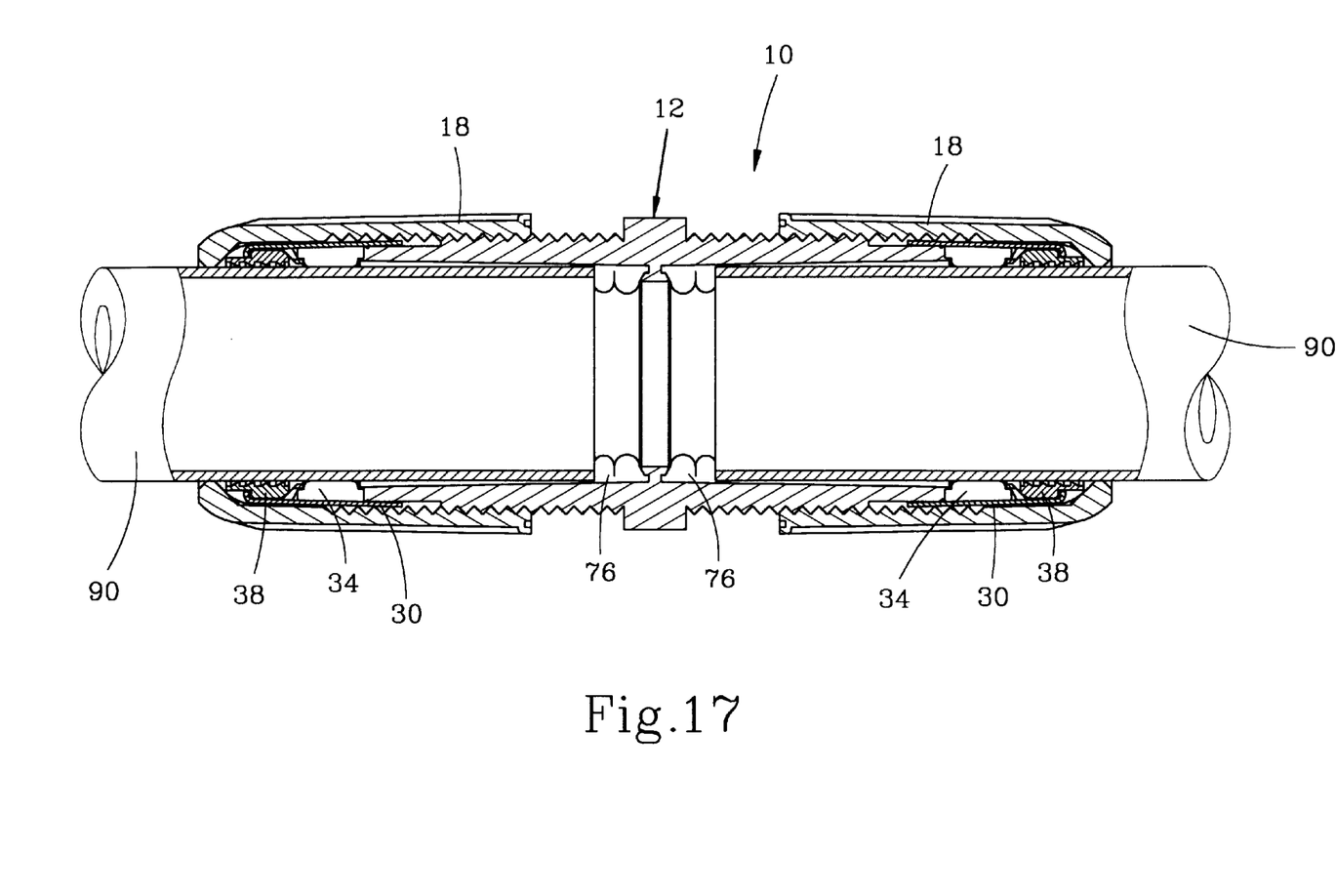
FIG. 17 is a sectional view similar to FIG. 16, but showing the condition where the end caps are tightened.
Figure 19:
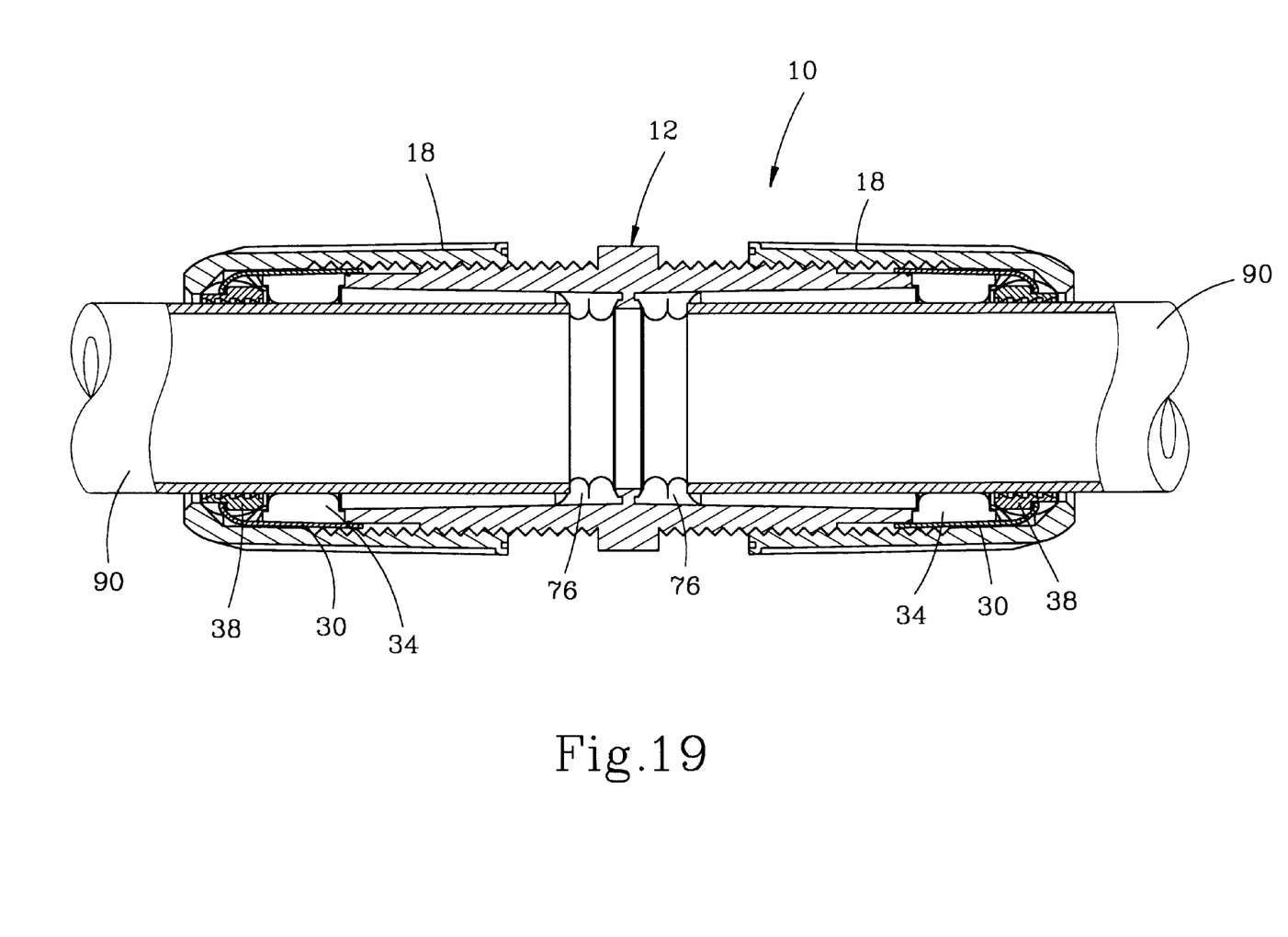
FIG. 19 is a sectional view similar to FIG. 18, but showing the condition where the end caps are tightened.

The centering and sealing ring 76 is made of a resilient or elastically deformable material, such as rubber or soft plastics, so that when the centering and sealing ring 76 is forcibly acted upon by the end of the inner tube segment 90, the centering and sealing ring 76 deforms to provide a sealing engagement between the inclined face 80 of the centering and sealing 76 and the end of the inner tube segment 90 as shown in FIGS. 17 and 19.

Preferably, the centering and sealing ring 76 comprises a circumferential groove 91 formed on an inside surface thereof, preferably axially centered, for enhancing the deformation of the centering and sealing ring 76 in providing centering and sealing operation of the centering and sealing ring 76.

Figure 8:
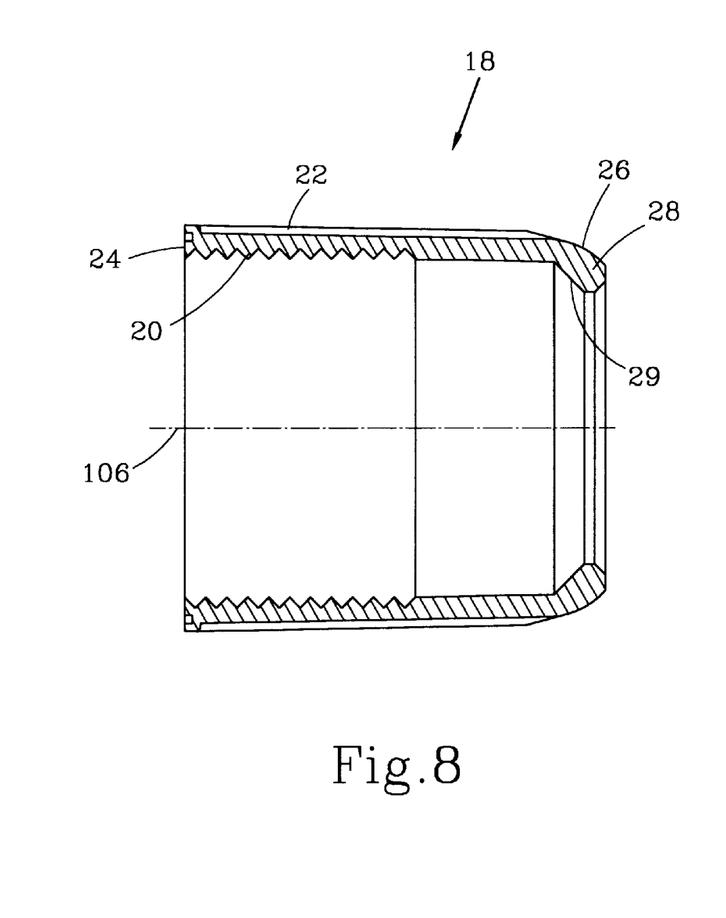
FIG. 8 is a sectional view of the end cap of the inner tube connector in accordance with the present invention.
Figure 9:
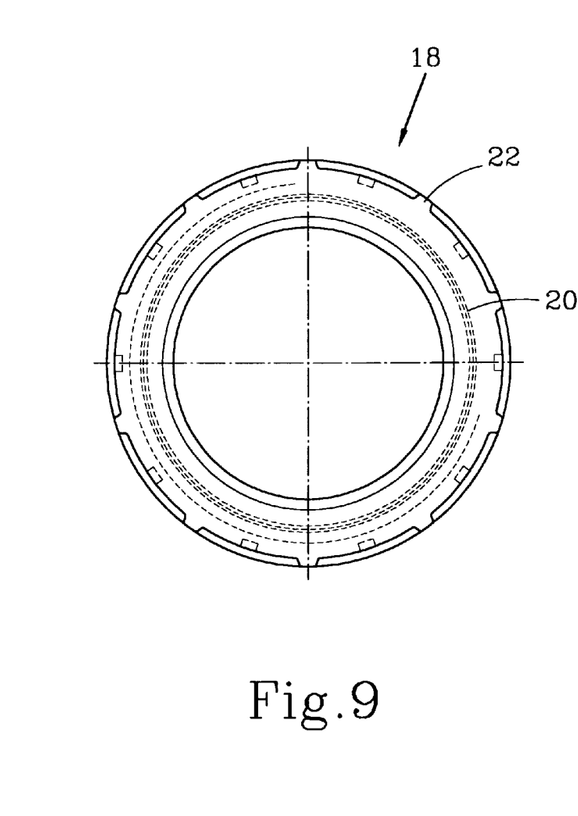
FIG. 9 is an axial end view of the end cap shown in FIG. 8.

The end cap 18 is a hollow cylindrical member having open ends 24 and 26, particularly shown in FIGS. 8 and 9, having a central axis 106 and comprising an inner-threaded section 20 engageable with the threaded section 16 of the cylindrical body 12 to have the central axis 106 of the end cap 18 substantially coincident with the central axis 100 of the cylindrical body 12, which allows the inner tube segment 90 to be inserted into the cylindrical body 12 through the open end 26 of the end cap 18. The end cap 18 comprises a plurality of ribs 22 formed on an outside surface for hand gripping. The ribs 22 may be replaced with other structure of the same function, such as knurling.

The end cap 18 engages the threaded section 16 of the cylindrical body 12 by means of the inner threading 20 thereof with the inner open end 24 thereof fit over the cylindrical body 12. The outer open end 26 of the end cap 18 comprises a circumferential, radially inward flange 28 which defines a circumferential shoulder for supporting an axial end of an inner tube gripping member 38 (see FIG. 3). An inclined face 29 is provided on the inside diameter of the inward flange 28, facing axially inward and converging in an axially outward direction to provide a wedging engagement with the gripping member 38 which converts inward axial movement of the end cap 18 relative to the cylindrical body 12 (caused by turning the end cap 18 relative to the cylindrical body 12) into a radial compression acting upon the gripping member 38 to deform the gripping member 38 radially inward. This will be further explained hereinafter.

Figure 6:
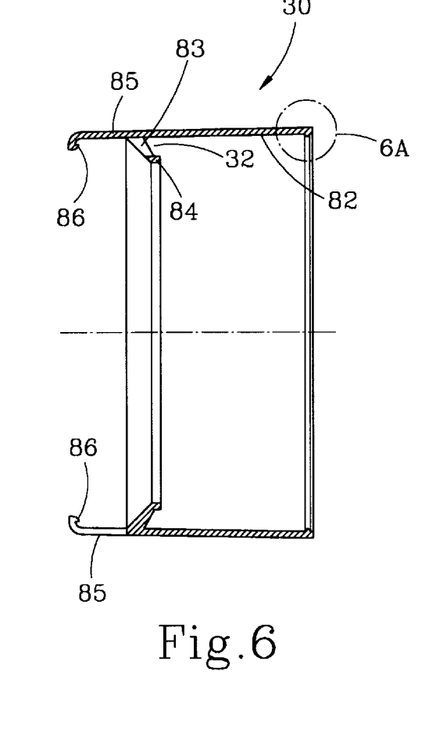
FIG. 6 is a sectional view of the retainer ring of the inner tube connector in accordance with the present invention.
Figures 6A, 7:
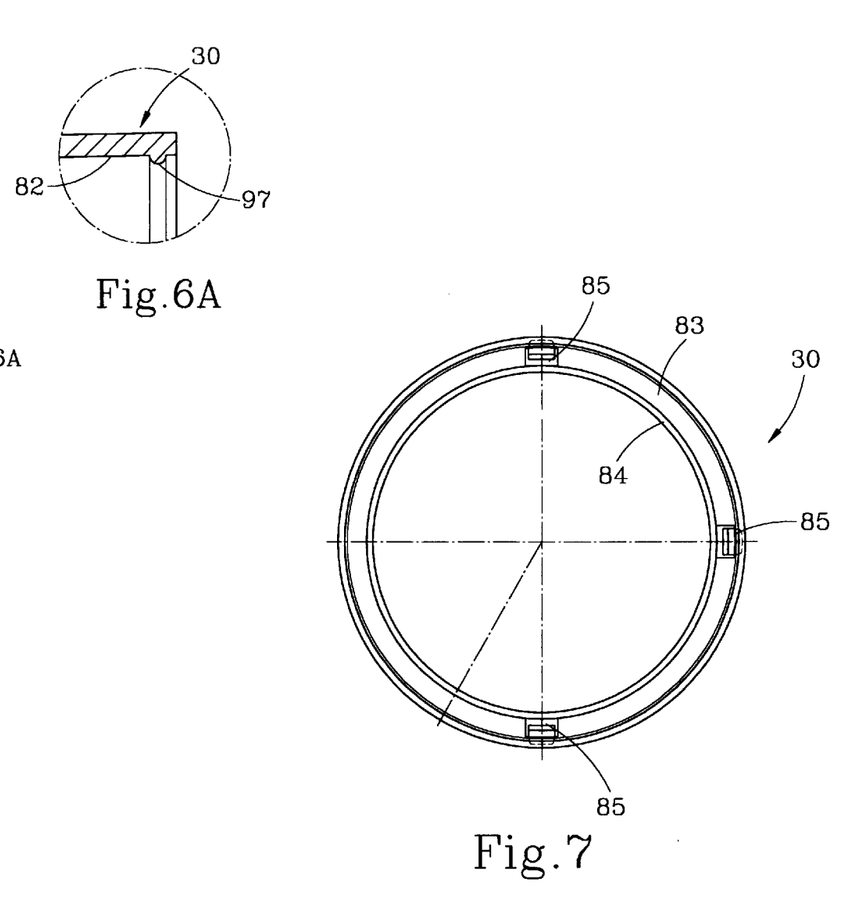
FIG. 6A is an enlarged view of the circled portion labeled 6A in FIG. 6.
FIG. 7 is an axial end view of the retainer ring shown in FIG. 6.

A retainer ring 30 has a cylindrical portion slidably fit over each of the non-threaded receiving sections 19 of the cylindrical body 12. FIGS. 6 and 7 respectively show a sectional view and an axial end view of the retainer ring 30. The retainer ring 30 has an inside surface 82 on which a circumferential rib 83 is formed. The rib 83 has a radial inner edge on which an axial extension 84 is formed. The axial extension 84 and the rib 83 define a circumferential channel 32 formed inside the cylindrical portion of the retainer ring 30, which channel 32, after mounted on the cylindrical body 12, faces axially inward. Preferably, the channel 32 is located at the axial outer end of the cylindrical portion of the retainer ring 30.

The retainer ring 30 also comprises a plurality of catches 85 which extend from the outer end of the cylindrical portion of the retainer ring 30 in the axially outward direction. Each of the catches 85 comprises a barb or hook 86 on an axially outer free end thereof with the barb 86 facing radially inward. The barb 86 is spaced from the rib 83 at a distance sufficient to accommodate a portion of the gripping member 38 therein, as shown in FIG. 3.

Preferably, the rib 83 inside the retainer ring 30 is inward inclined so as to define an inclined surface, as shown in FIG. 6.

The retainer ring 30 is slidably fit over the receiving section 19 of the cylindrical body 12 in such a way to have the channel 32 thereof spaced from the shoulder 17 of the receiving section 19 of the cylindrical body 12 at a distance sufficient to accommodate a primary sealing ring 34 therebetween (see FIG. 3). The channel 32 of the retainer ring 30 and the primary sealing ring 34 have an inside diameter large enough to allow the inner tube segment 90 to readily move therethrough and thus into the cylindrical body 12.

Figure 3A:
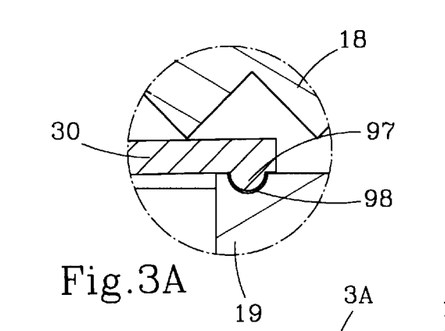
FIG. 3A is an enlarged view of the circled portion labeled 3A in FIG. 3.

Preferably, the retainer ring 30 has formed on the inside surface 82 thereof a circumferential holding rib 97, preferably in the proximity of the axial inner end of the cylindrical portion of the retainer ring 30 (see FIG. 6A) which is detachably received and temporarily held within a circumferential groove 98 formed on receiving section 19 of the cylindrical body 12 (see FIG. 4A) so as to form a releasable engagement therebetween (see FIG. 3A) which is capable to temporarily hold the retainer ring 30 on the receiving section 19 of the cylindrical body 12 before the associated end cap 18 is tightened.

Figure 12:
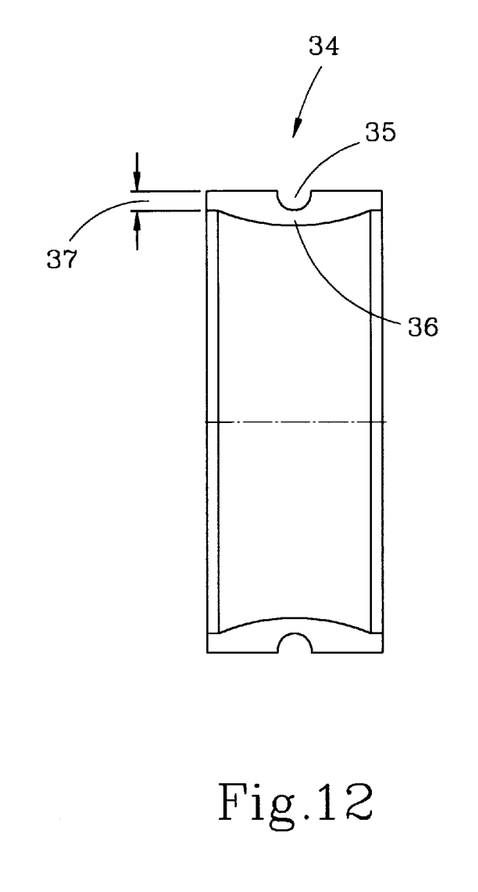
FIG. 12 is a sectional view of the primary sealing ring of the inner tube connector in accordance with the present invention.
Figure 13:
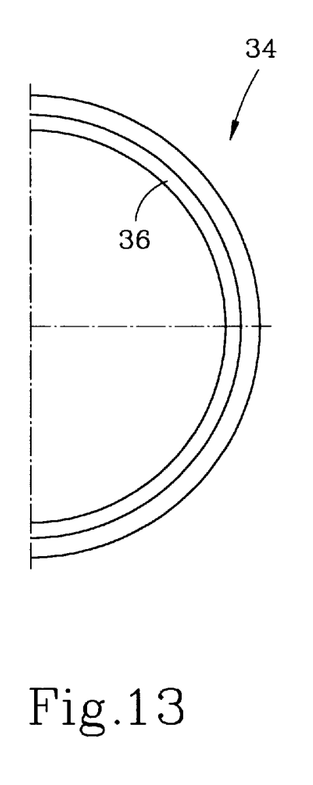
FIG. 13 is an axial end view of the primary sealing ring shown in FIG. 12, which due to symmetry is shown in half only.

FIGS. 12 and 13 respectively show a sectional view and an axial end view of the primary sealing ring 34.

With reference to FIGS. 3, 12 and 13, the primary sealing ring 34 is configured as a short cylinder made of a resilient or elastically deformable material, having a substantially straight cylindrical outside surface and an arcuated inside surface which is radially inward raised as indicated at 36, so as to have a maximum thickness at an axial center and gradually decreasing in the axial direction toward the two axial ends. The thickness (as indicated with reference numeral 37) of the primary sealing ring 34 at the axial ends of the primary sealing ring 34 is to have one of the axial ends receivable within the channel 32 of the retainer ring 30 and held therein and the other axial end fit over and supported on the shoulder 17 of the cylindrical body 12 and overlapped by cylindrical portion of the retainer ring 30 that is slidable on the receiving section 12, as shown in FIG. 3.

As mentioned previously, the inside diameter of the inward raised portion 36 of the primary sealing ring 34 is sufficient to allow the inner tube segment 90 to extend therethrough. Preferably, a circumferential slot or groove 35 is formed on the outside surface of the primary sealing ring 34 at a position substantially corresponding to the inward raised portion 36.

The retainer ring 30 retains the primary sealing ring 34 between the shoulder 17 of the cylindrical body 12 and the channel 32 of the retainer ring 30 and prevents the primary sealing ring 34 from expanding outward when it is subject to an axial force acting thereon. The circumferential groove 35, together with the inward raised structure 36 on the inside surface of the primary sealing ring 34, facilitates the radially inward expansion or deformation of the primary sealing ring 34 when the primary sealing ring 34 is subject to an axial force. More specifically, when the retainer ring 30 is axially moved relative to the cylindrical body 12 in an axially inward direction, the primary sealing ring 34 that is interposed between the shoulder 17 of the cylindrical body 12 and the channel 32 of the retainer ring 30 is axially compressed which collapses the groove 35 and forces the primary sealing ring 34 to expand or deform in the radially inward direction and eventually in tight contact engagement with the inner tube segment 90 so as to provide an air- and water-tight sealing engagement therebetween.

The cylindrical portion of the retainer ring 30 that extends over the primary sealing ring 34 not only serves to provide a constraint on the deformation direction of the primary sealing ring 34 when the primary sealing ring 34 is subject to an axial force and to maintain the primary sealing ring 34 between the shoulder 17 of the cylindrical body 12 and the channel 32 of the retainer ring 30, but also separates the primary sealing ring 34 from the inner threading 20 of the end cap 18 so that the rotation of the end cap 18 with respect to the cylindrical body 12 does not damage the primary sealing ring 34.

Figure 14:
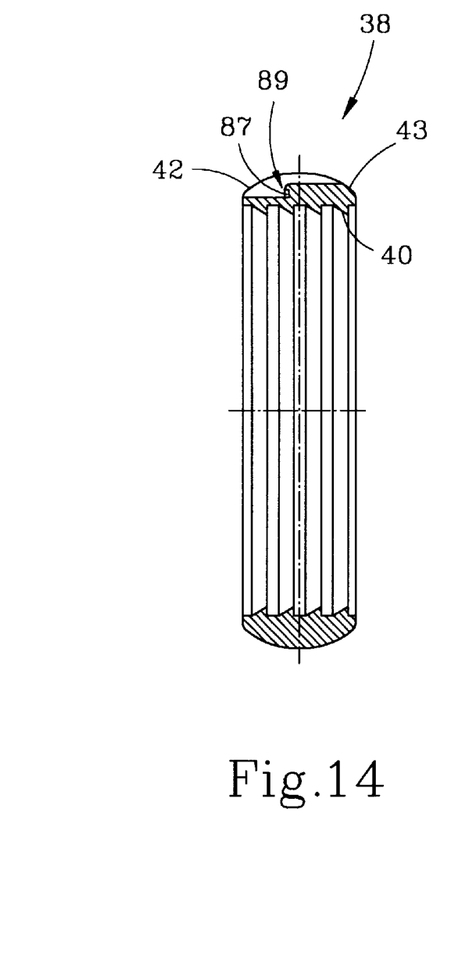
FIG. 14 is a sectional view of the C-shaped inner tube gripping member of the inner tube connector in accordance with the present invention.
Figure 15:
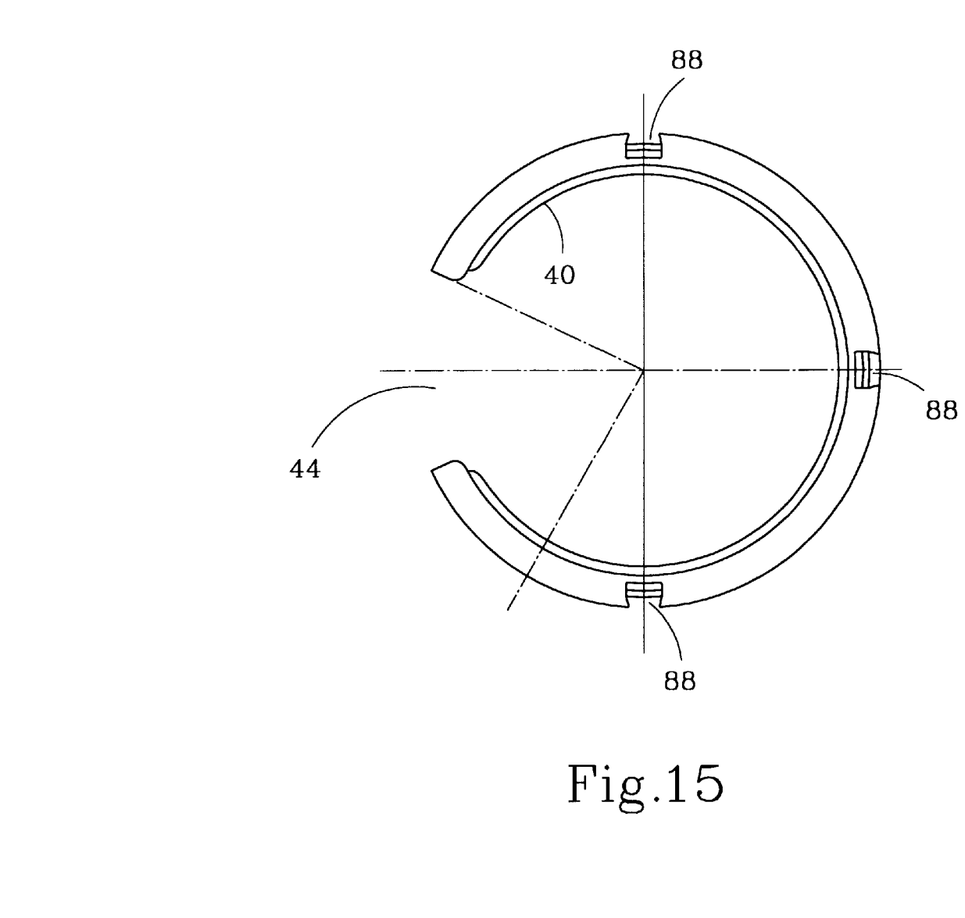
FIG. 15 is an axial end view of the gripping member shown in FIG. 14.

As discussed above, the connector 10 also comprises an inner tube gripping member 38, made of a deformable material, which is disposed between the inward flange 28 of the end cap 18 and the rib 83 of the retainer ring 30. The gripping member 38 has a C-shaped configuration having a sideways opening 44, as more clearly shown in FIGS. 14 and 15 which are respectively a sectional view and an axial end view of the gripping member 38. The gripping member 38 has a substantially straight inside surface having a first or initial diameter on which inner tube catching means 40 is provided (see FIG. 14). In the embodiment illustrated, the catching means 40 comprises a plurality of sharp teeth or barbs formed on the inside surface of the gripping member 38. Preferably, the teeth or barbs are inclined in the axially inward direction. The teeth 40 are capable to pierce into the inner tube segment 90 when they are forced against the inner tube segment 90 so as to securely fix the inner tube segment 90 to the connector 10 and prevent the inner tube segment 90 from being withdrawn out of the connector 10, as shown in FIGS. 17 and 19.

The first or initial inside diameter of the C-shaped gripping member 38 is defined as an inside diameter of the gripping member 38 when the gripping member 38 is not deformed, which inside diameter is large enough to allow the inner tube segment 90 to extend therethrough.

The gripping member 38 also comprises two axially opposite inclined faces 42 and 43 formed on the outside surface thereof so that the outside diameter of the gripping member 38 is gradually reduced from the maximum value at the axial center thereof toward the minimum value at the two opposite, axial ends. Preferably, the outside surface of the gripping member 38 is arcuated to define the two inclinations.

The sideways opening 44 of the gripping member 38 is to allow the gripping member 38 to be deformed in the radially inward direction. The radially inward deformation of the gripping member 38 reduces the inside diameter of the gripping member 38 from the first, initial inside diameter to a second, deformed inside diameter which in accordance with the present invention is smaller than the diameter of the inner tube segment 90 so that during the inward compression, the inner tube catching means 40 (the teeth or barbs) is forced to pierce into the inner tube segment 90 and thus securely fix the inner tube segment 90 inside the connector 10.

In accordance with the present invention, the gripping member 38 comprises a plurality of catch receiving cavities 87 to receivingly engage the barbs or hooks 86 of the catches 85 of the retainer ring 30 so as to fix the gripping member 38 to the retainer ring 30. Preferably, the outside surface of the gripping member 38 is provided with a plurality of axially-extending slots 88 having a size sufficient to accommodate the catches 85 of the retainer ring 30 therein. Each of the slots 88 has a radially recessed portion defining a shoulder 89 on which the respective catch receiving cavity 87 is formed so that when the barbs or hooks 86 of the catches 85 of the retainer ring 30 engage the cavities 87, the catches 85 are snugly received within the axial slots 88. This effectively holds the gripping member 38 in the retainer ring 30.

The second inclined face 43 of the gripping member 38 is formed to be corresponding to the inclination of the inside rib 83 of the retainer ring 30 so that when the gripping member 38 is accommodated between the inside rib 83 and the catches 85 of the retainer ring 30, the second inclined face 43 of the gripping member 38 substantially matches the inclination of the inside rib 83 of the retainer ring 30, as shown in FIG. 3. The inclination may be of any desired angle, or alternatively, there may be no such an inclination at all, if desired.

The first inclined face 42 of the gripping member 38 is arranged to be in contact and wedging engagement with the inclined face 29 of the end cap 18 which, together with the engagement between the second inclined face 43 of the gripping member 38 and the inclined rib 83 of the retainer ring 30, providing a wedging action that coverts an axial compression of the gripping member 38 caused by tightening and thus axially moving the end cap 18 inward on the cylindrical body 12 into radial compression which deforms the gripping member 38 radially inward with the deformation thereof being accommodated by the sideways opening 44 of the C-shaped configuration of the gripping member 38. The radially inward compression of the gripping member 38 reduces the inside diameter thereof from the initial first inside diameter to the deformed, second inside diameter which, as mentioned above, is smaller than the outside diameter of the inner tube segment 90 so as to have the barbs or teeth 40 piercing into the inner tube segment 90 and securely fix the inner tube segment 90 inside the connector 10.

By suitably sizing the sideways opening 44 of the gripping member 38, the gripping member 38 may be radially inward deformable to a substantial extent so that the reduction in the inside diameter of the gripping member 38 may be significant which allows the connector 10 to accommodate a great variation or tolerance of the outside diameter of the inner tube segments. In other words, inner tubes having outside diameter of substantial difference may be secured and fixed by the connector 10 in accordance with the present invention.

As mentioned above, the inclined outside surface configuration of the gripping member 38 may be replaced with an arcuated outside surface configuration which provides similar wedging engagement with the inclined faces 29 of the end cap 28 and the inclined rib 83 of the retainer ring 30.

During the radially inward compression of the gripping member 38, the catches 85 are radially inward deflected which also shortens the distance between the hooks 86 of the catches 85 and the inclined rib 83 of the retainer ring 30. As a consequence, wedging is caused between the second inclined face 43 of the gripping member 38 and the inclined rib 83 of the retainer ring 30 which helps driving the gripping member 38 radially inward, as can be best understood by comparing FIG. 18 which shows the condition before the end cap 18 is tightened to FIG. 19 which shows the condition after the end cap 18 is tightened.

The primary sealing ring 34 is also caused to move radially inward with the deformation of the gripping member 38 and the retainer ring 30.

At the time when the end cap 18 is tightened and moved relative to the cylindrical body 12, the already-deformed gripping member 38 is also caused to move axially inward to urge the retainer ring 30 axially inward, resulting in a relative displacement of the cylindrical portion of the retainer ring 30 with respect to the receiving section 19 of the cylindrical body 12. Consequently, the primary sealing ring 34 which is located between the circumferential channel 32 (or the rib 83) of the retainer ring 30 and the shoulder 17 of the cylindrical body 12 is axially compressed. The axially-compressed primary sealing ring 34 then deforms in the radial direction to sealingly engage the outside surface of the inner tube segment 90.

Since the gripping member 38 has been deformed to catch the inner tube segment 90, the axial inward movement of the gripping member 38 caused by tightening the end cap 18 also moves the inner tube segment 90 toward the circumferential rib 70 inside the central bore 102 of the cylindrical body 12 which in turn urges the inner end of the inner tube segment 90 against the inclined face 80 of the centering and sealing ring 76. Due to a camming and guiding action on the inner end of the inner tube segment 90 provided by the inclined face 80 of the centering and sealing ring 76, the inner tube segment 90 is centered at the central axis of the cylindrical body 12. This allows two inner tube segments 90 which are both centered in the cylindrical body 12 by means of the centering and sealing rings 76 to be in precise axial alignment with each other.

As mentioned above, the centering and sealing ring 76 is made of a resilient or elastically deformable material which not only centers the inner tube segment 90 within the central bore 102 of the cylindrical body 12, but is also deformable to provide a sealing engagement with the inner end of the inner tube segment 90 when it is urged by the inner end of the inner tube segment 90. Thus, besides centering the inner tube segment 90, the centering and sealing ring 76 also provides a hermetic sealing between the rib 70 of the connector 10 and the inner tube segment 90 that is received within the connector 10 which in combination with the sealing engagement of the primary sealing ring 34 with the outside surface of the inner tube segment 90 provides a very effective hermetic sealing between the connector 10 and the inner tube segment 90.

Figure 16:
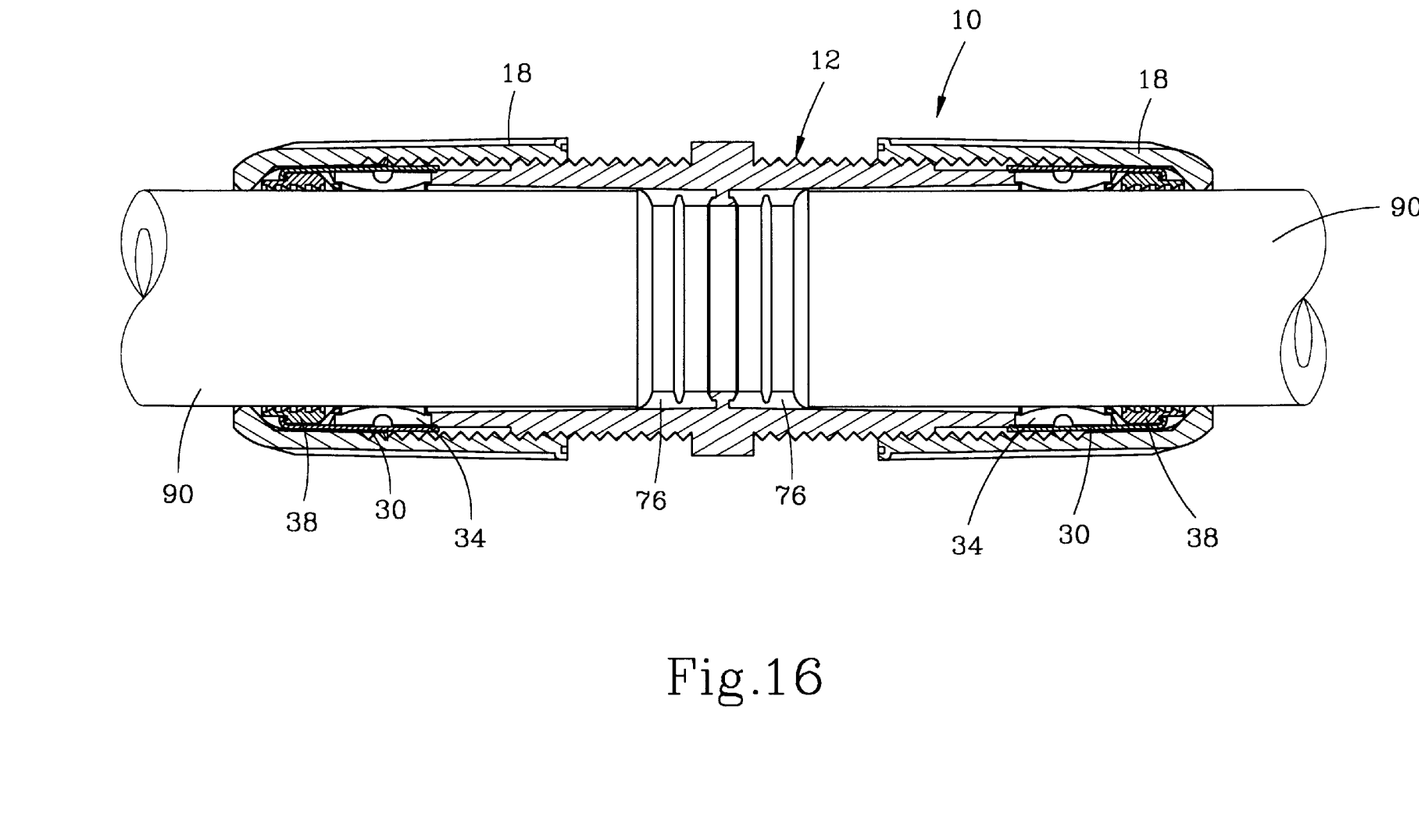
FIG. 16 is a sectional view showing two inner tube segments connected by the inner tube connector of the present invention with the end caps not tightened.

In mounting, the inner tube segments 90 are respectively inserted into the cylindrical body 12 of the connector 10 in two opposite direction along the central axis 100 of the cylindrical body 12, as shown in FIG. 16, and the end caps 18 are tightened, namely rotating in a direction to axially move the end caps 18 inward. With the tightening operation of the end caps 18, the inclined face 29 formed on the inward flange 28 of each of the end caps 18 and the inclined rib 83 of the associated retainer ring 30 generate a wedging force on the inclined faces 42 and 43 formed on the outside surface of the gripping member 38 to urge the gripping member 38 to deform in the radially inward direction. This forces the gripping member 38 to grip or catch the inner tube segment 90 by means of the catching means 40. Further tightening the end caps 18 urges the retainer rings 30 axially inward via the already-deformed gripping members 38 and this compresses the primary sealing rings 34 in the axial direction to force the inward raised portions 36 of the primary sealing rings 34 to radially deform and sealingly engage the inner tube segments 90 as shown in FIG. 17.

The axial movement of the gripping members 38 with the respective end caps 18 also causes the inner tube segments 90 to move axially inward so as to have the inner ends of the inner tube segments 90 urged against the incline faces 80 of the centering and sealing rings 76 to provide centering and sealing action on the inner tube segment 90, see FIG. 17.

Since in accordance with the present invention, during the tightening operation of the end caps 18, the gripping members 38 undergo a significant radially inward deformation to engage the inner tube segments 90 caused by the wedging engagement of the inclined faces 42 and 43 of the gripping members 38 with the inclined ribs 83 of the retainer rings 30 and the inclined faces 29 of the end caps 18, a large radial clearance may be present between the inner tube segments 90 and the inside surface of the gripping members 38. Also since the gripping member 38 and the primary sealing ring 34 both are made resilient (although may have different elasticity) and thus radially outward expandable, a large manufacturing tolerance on the outside diameter of the inner tube segment 90 may be accommodated by the connector 10 in accordance with the present invention.

Figure 18:
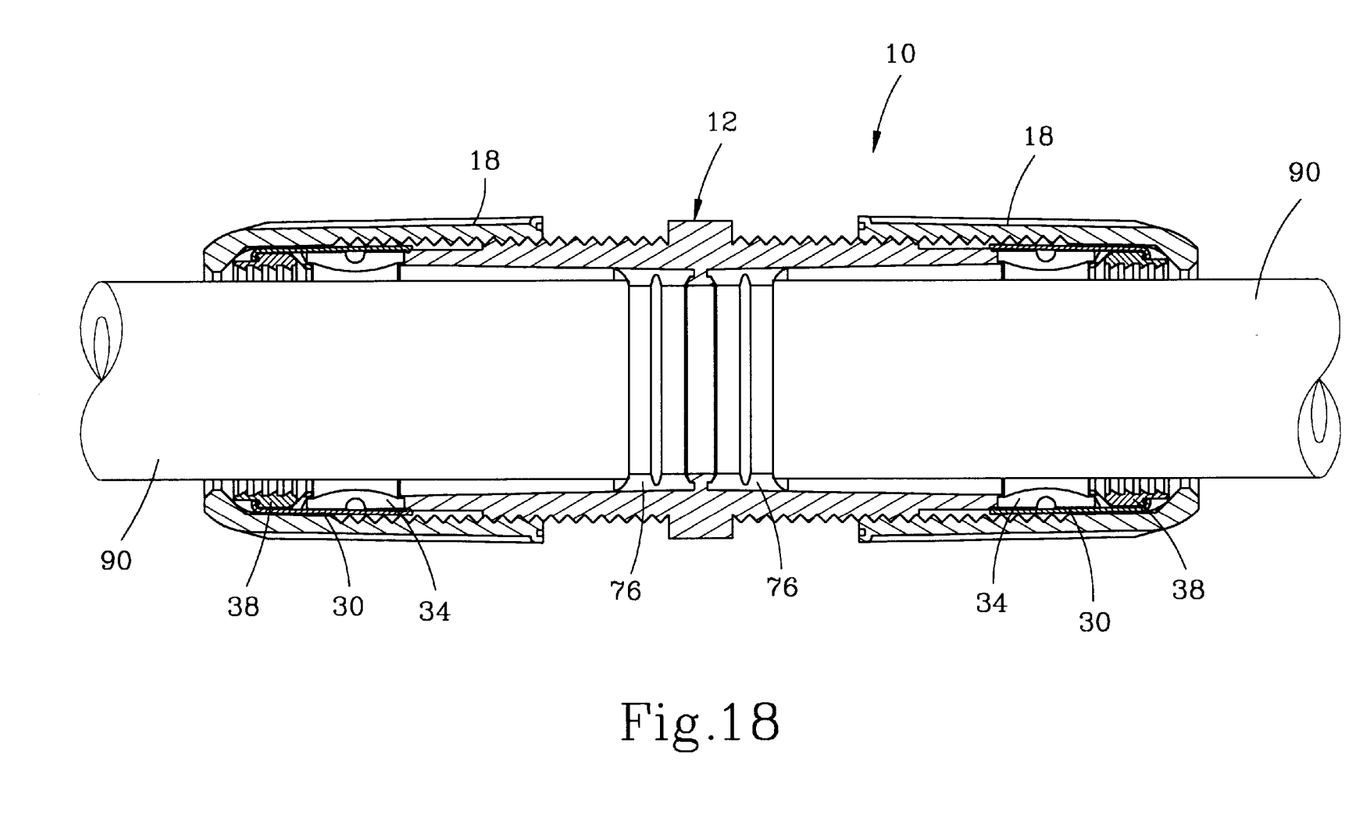
FIG. 18 is a sectional view showing two inner tube segments of smaller diameter connected by the inner tube connector of the present invention with the end caps not tightened, a greater radial gap being present between the connector body and the inner tube segments as compared with the condition shown in FIG. 16.

For example, as shown in FIG. 18, the connector 10 in accordance with the present invention is used to connect two inner tube segments 90 which has an actual outside diameter substantially smaller than the nominal outside diameter thereof. As shown, a remarkable gap is present between the outside diameter of the inner tube segments 90 and the inside diameter of the cylindrical body 12 (and the primary sealing ring 34 and the gripping member 38) which may be overcome by means of the wedging action provided by the present invention so as to have the catching means 40 effectively engaging and catching the outside diameter of the inner tube segment 90 as shown in FIG. 19. The axial compression of the primary sealing ring 34 which leads in a substantial inward protrusion of the inward raised portion 36 of the primary sealing ring 34 provides an effective air-tight engagement with the outside diameter of the inner tube segment 90, while the inclined face 80 of the centering and sealing ring 76 centers the inner tube segment 90 and provides an air- and water-tight sealing engagement with the inner end of the inner tube segment 90.

A feature of the present invention is the provision of the catches 85 of the retainer ring 30 which engage the cavities 87 of the gripping member 38 so as to effectively hold the gripping member 38 in the retainer ring 30 and prevent the gripping member 38 from accidentally disengaging from the retainer ring 30. This facilitates the installation of the connector 10 of the present invention at a working site.

It is apparent that although the present invention is illustrated with the description of the preferred embodiment, it is contemplated that there may be changes and modifications in the described embodiment that can be carried out without departing from the scope of the invention which is intended to be limited only by the appended claims.

What is claimed is:

1. An optic fiber inner tube connector adapted to connect two inner tube segments, comprising:

an elongated connector body having a central bore extending through the length thereof and having a central axis so as to define two axial ends of the body, the body having an outside surface with two threaded sections formed thereon;

an end cap in the form of a hollow member having an axial inner open end having inner threading engageable with each of the threaded sections of the connector body so as to be axially movable along the threaded section of the body by rotating the end cap relative to the body, the end cap having an axial outer open end on which a circumferential, radially inward flange is formed, having an inside diameter large enough to receive the respective inner tube segment extending therethrough;

a gripping member made of a resilient material and disposed between the circumferential flange of each of the end caps and the respective axial end of the connector body so as to be movable in the axial direction by means of the axial movement of the end cap, the gripping member having a C-shaped configuration having a first diameter which allows the respective inner tube segment to extend therethrough and having a sideways opening to allow the gripping member to be radially inward deformable with the inside diameter thereof changing from the first diameter to a smaller second diameter to engage the inner tube segment extending therethrough, catching means being provided on the gripping member so that when the gripping member is radially inward deformed to engage the inner tube segment, the catching means firmly grips the inner tube segment and thus securely fixes the inner tube segment in the connector body;

wedging means which converts the axial movement of each of the end caps into a radially inward deformation of the respective gripping member to force the gripping member to radially inward deform from the first diameter to the second diameter so as to secure the inner tube segment in the connector body; and sealing means arranged between the connector body and each of the inner tube segments to provide a hermetic sealing therebetween, the sealing means comprising a retainer ring associated with each of the end caps, the retainer ring having a tubular main portion slidably fit over the respective axial end of the connector body and a circumferential rib formed inside the main body to define a circumferential channel, a primary elastically-deformable sealing ring having an axial end fixed on the axial end of the connector body and an opposite axial end received, held and supported by the circumferential channel of the retainer ring, gripping member holding means which is provided on the retainer ring to securely hold the respective gripping member in the retainer ring so that when the end cap is rotated to axially move inward relative to the connector body and thus urge the gripping member axially inward, the retainer ring moves axially inward with the movement of the end cap and the gripping member to compress and deform the primary sealing member located between the retainer ring and the respective axial end of the connector body so as to sealingly engage the respective inner tube segment.

2. The connector as claimed in claim 1, wherein the catching means of the gripping member comprises a plurality of sharp teeth provided on an inside surface of the gripping member to pierce into and thus securely fix the inner tube segment in the connector body.

3. The connector as claimed in claim 2, wherein the teeth are inclined in the axial inward direction.

4. The connector as claimed in claim 3, wherein the primary sealing ring comprises a circumferential, radially inward raised portion formed on an inside surface of the primary sealing ring and deformable to sealingly engage the respective inner tube segment when the primary sealing ring is axially compressed by the axial movement of the end cap.

5. The connector as claimed in claim 1, wherein the wedging means comprises an inclined face formed on an outside surface of the gripping member and a mated inclined face formed on the circumferential flange of the end cap which are in camming engagement with each other so that a wedging action is provided therebetween which converts the axial movement of the end cap into radial deformation of the gripping member.

6. The connector as claimed in claim 1, wherein the gripping member holding means of the retainer ring comprises a plurality of catches extending from the main portion of the retainer ring in an axially outward direction, each of the catches having an axial outer free end with a hook formed thereon and facing radially inward to engage a corresponding cavity formed on the gripping member so as to secure the gripping member between the hooks and the circumferential rib of the retainer ring.

7. The connector as claimed in claim 6, wherein the gripping member has an outer surface on which a plurality of axial slots are formed to respectively receive the catches of the retainer ring therein, each of the axial slots having a radially extending shoulder on which the cavity is formed to engage the hook on the free end of the respective catch of the retainer ring.

8. The connector as claimed in claim 1, wherein the end cap comprises ribs formed on an outside surface thereof for hand gripping.

9. The connector as claimed in claim 1, further comprising a centering and sealing ring located inside the central bore of the connector body to be associated with each of the inner tube segments, the centering and sealing ring having a central axis substantially coincident with the central axis of the connector body, comprising a centering inclined face which diverges axially outward to be in contact engagement with an inner end of the inner tube segment for centering the inner tube segment so as to have a radial center of the inner tube segment substantially coincident with the central axis of the connector body.

10. The connector as claimed in claim 9, wherein the connector body comprises a circumferential, inward raised portion formed inside the central bore, having two axially opposite sides, each having a circumferential slot formed thereon to receive and hold therein an axial end rim of each of the centering and sealing rings so as to fix the centering and sealing ring inside the connector body.

11. The connector as claimed in claim 9, wherein the centering and sealing ring is made of a resilient material which is deformable when contacted and urged by the inner end of the inner tube segment to provide a hermetic sealing therebetween.

12. The connector as claimed in claim 11, wherein the centering and sealing ring comprises a circumferential groove formed on an inside surface of the centering and sealing ring.

13. The connector as claimed in claim 9, wherein the centering inclined face of the centering and sealing ring comprises a concave circular arc configuration.

14. The connector as claimed in claim 1, wherein the retainer ring has a circumferential holding rib formed inside the main body thereof to be releasably received and held in a circumferential groove formed on the outside surface of the connector so as to temporarily and releasably hold the retainer ring on the connector body.

* * * * *